(12) United States Patent
Chandrashekar et al.

(10) Patent No.: US 7,473,745 B2
(45) Date of Patent: Jan. 6, 2009

(54) PREPARATION OF MULTIMODAL POLYETHYLENE

(75) Inventors: Venki Chandrashekar, Houston, TX (US); Mark P. Mack, West Chester, OH (US); Charles H. Gates, Jr., Lake Jackson, TX (US); Charles S. Holland, Coal City, IL (US); Natalia Nagy, Naperville, IL (US); Sandor M. Nagy, Naperville, IL (US); Edward S. Vargas, Loveland, OH (US); Jean A. Merrick-Mack, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 427 days.

(21) Appl. No.: 11/218,888

(22) Filed: Sep. 2, 2005

(65) Prior Publication Data

US 2007/0055021 A1    Mar. 8, 2007

(51) Int. Cl.
*C08F 4/06* (2006.01)

(52) U.S. Cl. .............. 526/65; 526/73; 526/79; 526/113; 526/118; 526/161; 526/172; 526/348.2; 526/348.3; 526/348.6; 526/352

(58) Field of Classification Search ............... 526/113, 526/118, 172, 161, 65, 73, 79, 905, 348.2, 526/348.3, 348.6, 352
See application file for complete search history.

(56) References Cited

U.S. PATENT DOCUMENTS

| 5,371,053 | A | 12/1994 | Agapiou et al. | 502/56 |
| 5,442,019 | A | 8/1995 | Agapiou et al. | 526/82 |
| 5,464,905 | A | 11/1995 | Tsutsui et al. | 525/240 |
| 5,747,594 | A | 5/1998 | deGroot et al. | 525/240 |
| 6,211,311 | B1 | 4/2001 | Wang et al. | 526/131 |
| 6,232,260 | B1 | 5/2001 | Nagy et al. | 502/155 |
| 6,372,864 | B1 | 4/2002 | Brown | 526/65 |
| 6,545,105 | B1 * | 4/2003 | Follestad et al. | 526/65 |
| 6,861,485 | B2 * | 3/2005 | Wang | 526/119 |
| 2001/0039314 | A1 | 11/2001 | Mehta et al. | 525/240 |
| 2004/0259722 | A1 | 12/2004 | Wang | 502/103 |
| 2005/0137337 | A1 | 6/2005 | Kwalk | 525/191 |

FOREIGN PATENT DOCUMENTS

| EP | 770 629 A2 * | 5/1997 |
| WO | WO 98/57998 | 12/1998 |

OTHER PUBLICATIONS

R. N. Shroff and H. Mavridis, Long-Chain-Branching Index for Essentially Linear Polyethylenes, *Macromolecules* 1999, 32, pp. 8454-8464.

Wallace W. Yau and David Gillespie, New Approaches Using MW-sensitive Detectors in GPC-TREF for Polyolefin Characterization, *Polymer*, vol. 42, pp. 8947-8958 (2001).

* cited by examiner

*Primary Examiner*—Bernard Lipman
(74) *Attorney, Agent, or Firm*—Shao-Hua Guo

(57) ABSTRACT

Disclosed is a polyethylene composition. The composition comprises single-site multimodal resin A and single-site multimodal resin B, wherein resin A differs from resin B in molecular weight, in monomeric composition, in density, in long chain branch concentration or distribution, or in combinations thereof. Disclosed is also a method for making the polyethylene composition. The method comprises polymerizing, in the presence of two or more single-site catalysts, ethylene or its mixture with a $C_3$-$C_{10}$ α-olefin to form a first multimodal resin and continuing the polymerization in the presence of the same catalysts but in a different hydrogen concentration, in a different monomer composition, or at a different temperature to form a second multimodal resin.

7 Claims, No Drawings

PREPARATION OF MULTIMODAL POLYETHYLENE

FIELD OF THE INVENTION

The invention relates to preparation of multimodal polyethylene. More particularly, the invention relates to multimodal polyethylene having more than two modes.

BACKGROUND OF THE INVENTION

Single-site polyethylene has narrow molecular weight distribution and uniform composition distribution (i.e., the comonomer recurring units are uniformly distributed along the polymer chains). The combination of narrow molecular weight distribution and uniform composition distribution distinguishes single-site polyethylene from conventional polyethylene made by Ziegler or chromium catalysts. Compared to Ziegler polyethylene, single-site polyethylene has improved impact resistance, tensile strength, and optical properties.

However, the uniformity of molecular weight distribution causes reduced thermal processability of single-site polyethylene. It is difficult to process single-site polyethylene under the conditions normally used for Ziegler polyethylene. The reduced processability limits the development of single-site polyethylene because the alteration of the process conditions requires a large capital investment. Accordingly, it would be highly desirable to prepare polyethylene which possesses the improved physical properties offered by single site catalysts and also exhibits processability characteristics which are similar to those of conventional polyethylene.

One approach to achieve this object is by using mixed catalyst systems. For instance, U.S. Pat. No. 5,747,594 teaches a two-stage polymerization process. In a first stage, ethylene and a higher α-olefin are polymerized with a single-site catalyst. The polymerization continues in a second stage where a Ziegler catalyst is used. Therefore, the product is a mixture of single-site polyethylene and Ziegler polyethylene. The disparity of the two polymers in molecular weight and composition gives the product an improved thermal processability.

Another alternative is using a single-site catalyst in two polymerization reactors which are operated with different activators. For instance, an alumoxane is used in one reactor and an ionic activator is used in the other. The use of different activators results in polyethylene made in the different reactors having different molecular weights and thus the combined polyethylene has a broad molecular weight distribution and an improved processability. See U.S. Pat. No. 6,372,864.

However, the use of mixed catalysts or activators is generally associated with operability problems. The two different catalysts or activators may interfere with one another, for example, the organoaluminum compounds which are often used in Ziegler catalyst poison single-site catalysts. Therefore, catalyst deactivation is often involved when two incompatible catalyst systems are used. Catalyst deactivation is costly and complicated. See U.S. Pat. Nos. 5,371,053 and 5,442,019. Further, while mixing single-site polyethylene with Ziegler polyethylene may improve the processability, it also reduces the property characteristics of the single-site polyethylene.

Multimodal polyethylene can be made by a dual process using only single-site catalyst. For instance, co-pending application Ser. No. 10/462,493 teaches a dual olefin polymerization process. The process uses a bridged indenoindolyl ligand-containing Group 4 transition metal complex and an activator. It is carried out in multiple stages or in multiple reactors. The same complex and the same activator are used in all stages or reactors. Different polyethylenes are made in different stages or reactors by varying the monomer compositions, hydrogen concentrations, or both. The dual process usually can conveniently produce a bimodal resin. Given that each mode has relatively narrow molecular weight distribution, the bimodal resin, nevertheless, lacks optimal processability.

In sum, new process for producing single-site polyethylene is needed. Ideally, the process would use two or more single-site catalysts and produce polyethylene that has more than two modes.

SUMMARY OF THE INVENTION

The invention is a process for making multimodal polyethylene resins. The process comprises two or more stages. In a first stage, ethylene or a mixture of ethylene and a $C_3$ to $C_{10}$ α-olefin is polymerized in the presence of two single-site catalysts. In a second stage, the polymerization continues in the presence of the same catalysts but in a different monomer composition, in a different hydrogen concentration, or at a different temperature to produce a second multimodal resin.

The invention includes a polyethylene composition. The composition comprises multimodal resin A and multimodal resin B. Resin A differs from resin B in molecular weight, monomeric composition, density, long chain branch concentration, or long chain branch distribution.

The invention provides a method for making single-site multimodal polyethylene that has more than two modes. The polyethylene of the invention not only has improved processability but also maintains the property characteristics of single-site resins.

DETAILED DESCRIPTION OF THE INVENTION

The process of the invention comprises two or more stages. In a first stage, ethylene or a mixture of ethylene and a $C_3$ to $C_{10}$ α-olefin is polymerized in the presence of two or more single-site catalysts to produce a first multimodal polyethylene resin. In a second stage, the polymerization continues in the presence of the same catalysts but in a different monomer composition, in a different hydrogen concentration, or at a different temperature.

Suitable $C_3$ to $C_{10}$ α-olefins include propylene, 1-butene, 1-pentene, 1-hexene, 1-octene, 4-methyl-1-pentene, the like, and mixtures thereof. When ethylene is polymerized, a homopolymer is formed. When a mixture of ethylene and a $C_3$ to $C_{10}$ α-olefin is polymerized, a copolymer is formed. Incorporating a $C_3$ to $C_{10}$ α-olefin lowers the density of the resin. Preferably, the first multimodal resin is higher in density than the second multimodal resin. That is, the first stage is performed at a higher ethylene/$C_3$ to $C_{10}$ α-olefin ratio than the second stage. Preferably, the first stage forms a multimodal high density polyethylene (HDPE, density 0.941 g/cm$^3$ or greater) or medium density polyethylene (MDPE, density from 0.926 to 0.940 g/cm$^3$), while the second stage forms a multimodal linear low density polyethylene (LLDPE, density from 0.910 to 0.925 g/cm$^3$), or ultra-low density polyethylene (ULDPE, density lower than 0.910 g/cm$^3$).

Suitable single-site catalysts include those two of which when used together produce a multimodal polyethylene resin. In other words, the two single-site catalysts produce polymers having substantially different molecular weights, monomeric compositions, densities, long chain branch concentrations, long chain branch location, or combinations thereof.

Preferably, at least one of the single-site catalysts present in the first stage is an indenoindolyl single-site catalyst, i.e., an indenoindolyl ligand-containing Group 4 transition metal complex. Preferred Group 4 transition metals are zirconium and titanium. Zirconium is particularly preferred. Indenoindolyl ligands can be generated by deprotonating an indenoindole compound using a potent base. By "indenoindole compound," we mean an organic compound that has both indole and indene rings. The five-membered rings from each are fused, i.e., they share two carbon atoms. Preferably, the rings are fused such that the indole nitrogen and the only $sp^3$-hybridized carbon on the indenyl ring are "trans" to each other. Such is the case in an indeno[1,2-b] ring system:

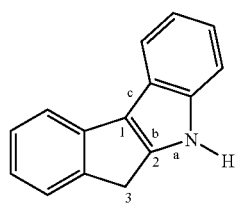

Suitable ring systems also include those, in which the indole nitrogen and the $sp^3$-hybridized carbon of the indene are beta to each other, i.e., they are on the same side of the molecule. This is an indeno[2,1-b]indole ring system:

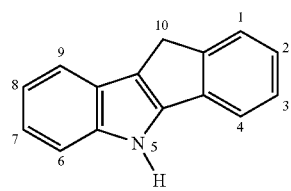

The ring atoms can be substituted. Suitable indenoindolyl ligand includes those represented by

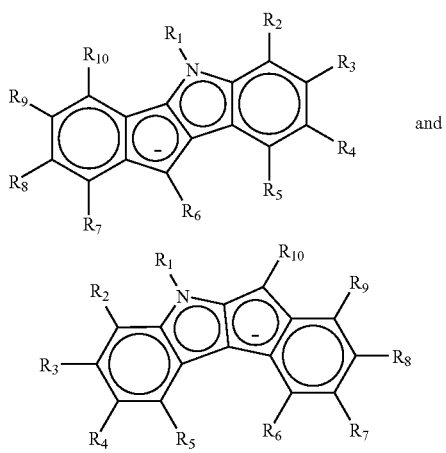

wherein $R_1$ is selected from the group consisting of alkyl, aryl, aralkyl, and silyl groups; $R_2$ through $R_{10}$ are the same or different and selected from the group consisting of hydrogen, alkyl, aryl, aralkyl, alkylaryl, silyl, halogen, alkoxy, aryloxy, siloxy, nitro, dialkyl amino, and diaryl amino groups.

Methods for making indenoindole compounds are known. Suitable methods and compounds are disclosed, for example, in U.S. Pat. No. 6,232,260, the teachings of which are incorporated herein by reference.

Preferably, the catalysts present in stage one comprise a bridged indenoindolyl catalyst and a non-bridged indenoindolyl catalyst. By "bridged indenoindolyl catalyst," we mean that the indenoindolyl ligand is bridged to another ligand, and both moieties coordinate to the transition metal. Preferably, the bridged and non-bridged catalysts have, respectively, the following general structures:

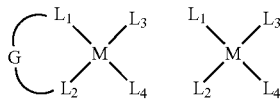

M is a Group 4 transition metal; G is a bridging group; $L_1$ is an indenoindolyl ligand; $L_2$ is a ligand selected from the group consisting of cyclopentadienyls, indenyls, fluorenyls, boraaryls, pyrrolyls, azaborolinyls, quinolinyls, indenoindolyls, and phosphinimines. Preferably, $L_2$ is a cyclopentadienyl ligand.

$L_3$ and $L_4$, the same or different, are independently selected from the group consisting of hydrogen, halogens, alkyls, aryls, alkoxys, aryloxys, siloxys, alkyl aminos, and aryl aminos. Preferably, at least one of $L_3$ or $L_4$ is halogen. More preferably, both $L_3$ and $L_4$ are halogen. Most preferably, both $L_3$ and $L_4$ are chlorine.

Bridging group, G, covalently connects the indenoindolyl ligand and the other ligand. Suitable bridging groups include $CR_2$, $C_2R_4$, $SiR_2$, $Si_2R_4$, $GeR_2$, $Ge_2R_4$, $R_2SiCR_2$, NR, and PR. Preferably, G is selected from the group consisting of dialkylsilyl, diarylsilyl, tetraalkyldisilyl, ethylidene, isopropylidene, methylene, dimethylene, 1,2-diphenylene, 1,4-diphenylene, and the like. Particularly preferred are methylene, dimethylene, isopropylidene, and dimethylsilyl.

We have found that the bridged indenoindolyl catalyst, for instance, $Me_2Si(indeno[1,2-b]indolyl)(Cp)ZrCl_2$ produces a polyethylene having significantly higher molecular weight and higher comonomer incorporation than its non-bridged counterpart, $Me_2Si(indeno[1,2-b]indolyl)(Cp)ZrCl_2$. Thus, when two catalysts are present in the polymerization process, the bridged catalyst produces a polyethylene having significantly higher average molecular weight and higher branching than the non-bridged catalyst. A bimodal or multimodal resin is thus formed.

Preferably, the catalysts are used in a molar ratio of bridged/non-bridged from 1/10 to 10/1; more preferably from 1/5 to 5/1; and most preferably from 1/3 to 3/1.

Preferably, the catalysts are immobilized on supports. Preferably, the catalysts are mixed and immobilized on a same support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titanias, zirconias, magnesium chloride, and crosslinked polystyrene. Silica is most preferred.

Preferably, the support has a surface area in the range of about 2 to about 700 $m^2/g$, preferably about 100 to about 600 $m^2/g$, a pore volume in the range of about 0.1 to about 4.0 mL/g, an average particle size in the range of about 10 to about 500 μm, and an average pore diameter in the range of about 10 to about 1000 Å. They are preferably modified by heat treatment, chemical modification, or both. For heat treatment, the support is preferably heated at a temperature from about 50° C. to about 800° C. More preferably, the temperature is from about 50° C. to about 300° C.

Suitable chemical modifiers include organoaluminum, organosilicon, organomagnesium, and organoboron compounds. Organosilicon and organoboron compounds, such as hexamethyl-disilazane and triethylborane, are preferred. Suitable techniques to support a single-site catalyst are known. For instance, U.S. Pat. No. 6,211,311, which is incorporated herein by reference, discusses supporting heteroatomic ligand-containing single-site catalysts. Supported catalysts are suitable for gas phase, solution, and slurry polymerization.

The catalysts are used with an activator. Suitable activators include alumoxanes, alkyl aluminums, alkyl aluminum halides, anionic compounds of boron or aluminum, trialkylboron and triarylboron compounds, the like, and mixtures thereof. Examples include methyl alumoxane (MAO), polymeric MAO (PMAO), ethyl alumoxane, diisobutyl alumoxane, triethylaluminum, diethyl aluminum chloride, trimethylaluminum, triisobutyl aluminum, lithiumtetrakis (pentafluorophenyl) borate, lithium tetrakis(pentafluorophenyl)aluminate, dimethylanilinium tetrakis (pentafluorophenyl)borate, trityl tetrakis (pentafluorophenyl) borate, tris(pentafluorophenyl)borane, triphenylborane, tri-n-octylborane, the like, and mixtures thereof. MAO, PMAO, and tris-(pentafluorophenyl)borane are preferred.

Activators can be combined with the catalysts and the mixture is then immobilized on a support. Alternatively, the catalysts and the activator can be added separately to the polymerization reactor. Activators are generally used in an amount within the range of about 0.01 to about 100,000, preferably from about 0.1 to about 1,000, and most preferably from about 0.5 to about 300, moles per mole of the catalysts.

The single-site catalysts from stage 1 are carried into stage 2. Additional amounts of catalysts or activator may be provided in stage 2. A third single-site catalyst or activator may also be provided in stage 2 if necessary. Suitable third catalysts or activators are those discussed above.

Stage 1 and stage 2 can be performed at the same or different temperatures. Preferably, the temperature is within the range of about 40° C. to about 400° C. More preferably, the temperature is within the range of about 50° C. to about 150° C. Preferably, the temperature difference between stage 1 and stage 2 is greater than or equal to 20° C. More preferably, the temperature difference between stage 1 and stage 2 are greater than or equal to 50° C. The reaction temperature in each stage preferably remains essentially constant. Preferably, the reaction temperature in stage 2 is higher than in stage 1. Changing temperature can vary the catalyst activities and comonomer reactivity ratios, and thus change the polymer composition and properties.

Hydrogen is used in the process to control molecular weight. Usually, more hydrogen in the polymerization results in lower molecular weight of polyethylene. Thus, by varying the hydrogen concentration in each stage, multimodal polyethylene resins having different molecular weights can be produced.

One example of the process of the invention is that stage 1 is performed at a relatively high hydrogen/monomer ratio (ranging from 0.001/1 to about 10/1), while stage 2 is performed at a reduced hydrogen/monomer ratio. Hydrogen from stage 1 can be removed partly or completely before stage 2. By this process, the first multimodal resin is lower in overall average molecular weight than the second multimodal resin.

Alternatively, stage 1 is performed in the absence of hydrogen or at a relatively low hydrogen/monomer ratio (less than or equal to 1/1), while stage 2 is performed at an increased hydrogen/monomer ratio. By this process, the first multimodal resin is higher in overall average molecular weight than the second multimodal resin.

Within each stage, the monomer concentration, ethylene/comonomer ratio, and hydrogen/monomer ratio preferably remain essentially constant.

The stages of the process can be performed in a single reactor or multiple reactors. Take a two-stage process as an example. In a single-reactor process, the catalysts, hydrogen, and solvents (if used) are loaded in the reactor. Stage 1 begins by heating the reactor contents to a desired temperature and feeding the reactor with the desired amounts of monomers. After stage 1 is complete, hydrogen is removed (alternatively, more hydrogen is added), and stage 2 begins by feeding the reactor with the monomers that may be the same as or different from those used in stage 1.

In a two-reactor process, the reactors can be set parallel or in sequence. For example, in a parallel two-reactor process, stage 1 and stage 2 are performed simultaneously in two reactors; multimodal resins made therein are then mixed in either one of the reactors or in a third reactor or mixer.

In a sequential two-reactor process, a first stage is performed in a first reactor to produce a first multimodal resin. The first multimodal resin is then transferred into a second reactor wherein a second stage is performed to produce a second multimodal resin. The second multimodal resin is mixed with the first multimodal resin in-situ.

The process of the invention leads to a novel multimodal polyethylene composition. By "multimodal," we mean that a resin has two or more modes (i.e., components); each mode is characterized by different molecular weight, monomeric composition, density, long chain branch concentration, long chain branch distribution, or combinations thereof. For instance, a bimodal resin means that the resin has two modes that differ from each other in molecular weight, monomeric composition, density, long chain branch concentration, or long chain branch distribution.

The multimodal polyethylene composition of the invention comprises multimodal resin A and multimodal resin B. Resin A differs from resin B in molecular weight, monomeric composition, density, long chain branch concentration, long chain branch distribution, or combinations thereof. Preferably, resin A and resin B have different molecular weights. More preferably, a higher molecular weight mode of resin A overlaps with a lower molecular weight mode of resin B.

Preferably, each mode of resin A and resin B has an Mw/Mn less than or equal to 5.5. More preferably, each mode of resin A and resin B has an Mw/Mn less than or equal to 4.5. Most preferably, each mode of resin A and resin B has an Mw/Mn less than or equal to 3.5.

Preferably, resin A and resin B differ in density. Preferably, resin A has a higher density than resin B. More preferably, resin A is an HDPE or MDPE and resin B is an LLDPE or ULDPE.

Preferably, in both resin A and resin B, the higher molecular weight modes contain more comonomer recurring units than the lower molecular weight modes.

Preferably, the multimodal polyethylene composition of the invention has a resin A/resin B weight ratio from 10/90 to 90/10. More preferably, the polyethylene composition has a resin A/resin B weight ratio from 20/80 to 80/20. Most preferably, the polyethylene composition has a resin A/resin B weight ratio from 30/70 to 70/30.

Preferably, both resin A and resin B have long chain branches concentrated on their higher molecular weight modes. A uniqueness of the invention is that at least two single-site catalysts are present in the polymerization and one catalyst may be more in favor of forming long chain branches than the other. Thus, not only the concentration but also the location of the long chain branches can be controlled.

Long chain branching can be measured by NMR, 3D-GPC (see *Polymer*, Vol. 42, pp. 8947-8958 (2001)), and rheology. While NMR directly measures the number of branches, it cannot differentiate between branches which are six carbons or longer. 3D-GPC with intrinsic viscosity and light scattering detection can account for all branches that substantially increase mass at a given radius of gyration. Rheology is particularly suitable for detecting low level of long chain branches.

The concentration of long chain branches can be measured by the long chain branch index (LCBI). LCBI is a Theological index used to characterize low levels of long-chain branching. LCBI is defined as:

$$LCBI = \frac{\eta_0^{0.179}}{4.8 \cdot [\eta]} - 1$$

where $\eta_0$ is the limiting, zero-shear viscosity (Poise) at 190° C. and $[\eta]$ is the intrinsic viscosity in trichlorobenzene at 135° C. (dL/g). LCBI is based on observations that low levels of long-chain branching, in an otherwise linear polymer, result in a large increase in melt viscosity, $\eta_0$, with no change in intrinsic viscosity, $[\eta]$. See R. N. Shroff and H. Mavridis, "Long-Chain-Branching Index for Essentially Linear Polyethylenes," *Macromolecules*, Vol. 32 (25), pp. 8454-8464 (1999). Higher LCBI means a greater number of long-chain branches per polymer chain.

Preferably, the higher molecular weight modes of resin A and resin B have LCBI greater than or equal to 0.1. Introducing long chain branching to the polyethylene composition can improve the processability of the polyethylene.

Preferably, the multimodal polyethylene composition has an overall Mn within the range of about 5,000 to about 500,000. Preferably, the polyethylene composition has an overall Mw within the range of about 30,000 to about 1,000,000. Preferably, the polyethylene composition has an overall Mw/Mn within the range of about 3 to about 20, more preferably from about 4 to about 18, and most preferably from about 5 to about 17.

Alternatively, the molecular weight and molecular weight distribution can be indicated by melt indices. Melt index ($MI_2$) is usually used to measure the molecular weight and melt flow ratio (MFR) to measure the molecular weight distribution. A larger $MI_2$ indicates a lower molecular weight. A larger MFR indicates a broader molecular weight distribution. MFR is the ratio of the high-load melt index (HLMI) to $MI_2$. The $MI_2$ and HLMI can be measured according to ASTM D-1238. The $MI_2$ is measured at 190° C. under 2.16 kg pressure. The HLMI is measured at 190° C. under 21.6 kg pressure. Preferably, the polyethylene composition has an $MI_2$ from about 0.01 to about 150 dg/min. Preferably, the polyethylene composition has an MFR from about 15 to about 300.

The following examples merely illustrate the invention. Those skilled in the art will recognize many variations that are within the spirit of the invention and scope of the claims.

EXAMPLE 1

Preparation of a Bridged Indenoindolyl Catalyst: Dimethylsilyl-Bridged Indeno[1,2-B]Indolyl Cyclopentadienyl Zirconium Dichloride (a) Preparation of Indeno[1,2-b]indole A mixture of 1-indanone (30.6 g, 232 mmol) and p-tolylhydrazine hydrochloride (37.0 g, 233 mmol) in EtOH (350 mL) and aqueous HCl (12 N, 18 mL) are heated to reflux for 90 min. The mixture is cooled and filtered, and the solid is washed with EtOH (600 mL) followed by 20% aqueous EtOH (400 mL) and finally hexanes (200 mL). The off-white solid is dried under vacuum (36.5 g, 72%).

(b) N-Methylation

A mixture of product (a) (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of MeI (17.0 mL, 273 mmol) in toluene (15 mL) is added dropwise, and the mixture is stirred at room temperature for 4 h and refluxed for 3 h. A crystalline solid forms upon cooling and is filtered and washed with cold (−78° C.) EtOH (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product (total yield 25.7 g, 66%).

(c) Anion Generation n-Butyllithium (n-BuLi) (120 mL, 2.5 M, 1.6 mol) is added dropwise to a solution of product (b) (43.9 g, 188 mmol) in toluene (560 mL). A precipitate forms after an hour. The mixture is allowed to stand for 48 h and is filtered. The solid is washed with toluene (500 mL), then hexanes (500 mL), and is dried under vacuum (40.3 g, 90%).

(d) Reaction with Dichlorodimethylsilane

A solution of product (c) (23.3 g, 97.4 mmol) in toluene (240 mL) and $Et_2O$ (160 mL) is added to a solution of $SiCl_2Me_2$ (60.0 mL, 495 mmol) in $Et_2O$ (170 mL). The mixture becomes cloudy and is stirred for 48 h and filtered over Celite. Volatiles are removed under vacuum to afford a gray solid (24.8 g, 78%).

(e) Dianion Generation

Sodium cyclopenta-dienide (16.0 mL, 2 M, 32.0 mmol) is added to a solution of the product from step (d) (9.62 g, 29.5 mmol) in $Et_2O$ (240 mL). A solid forms immediately, and the mixture is maintained at room temperature overnight. The crude mixture is washed with $H_2O$ (100 mL). The organic phase is dried over $Na_2SO_4$ and filtered. Evaporation to dryness gives an oil. The oil is dissolved in $Et_2O$ (250 mL) and cooled to −78° C. n-Butyllithium (28.0 mL, 2.5 M, 70.0 mmol) is added dropwise and the mixture warms slowly to room temperature. Stirring continues for 24 h. A yellow solid forms; the mixture is filtered; and the solid is dried under vacuum (12.3 g, 99%).

(f) Preparation of Zirconium Complex

The dianion of step (e) (7.94 g, 21.6 mmol) is added as a solid to a solution of $ZrCl_4$ (5.03 g, 21.6 mmol) in toluene (250 mL) and $Et_2O$ (50 mL). The mixture turns orange and is maintained at room temperature for 48 h and then filtered. The solid is washed with toluene (200 mL), then hexanes (50 mL), and is dried under vacuum (4.0 g, 36%) to give the catalyst.

EXAMPLE 2

Preparation of an Non-Bridge Indenoundolyl Catalyst: Indeno[1,2-B]Indolyl Cyclopentadienyl Zirconium Dichloride In a glovebox under nitrogen, N-methylated indeno[1,2-b] indole (14.2 g, 60.9 mmol), prepared as described in Example 1, is dissolved in toluene (175 mL). n-Butyllithium (38.0 mL of 2.5 M solution in hexanes, 95 mmol) is added carefully under vigorous stirring at room temperature to give a red solution. After one hour, a precipitate forms. The mixture is kept at room temperature overnight and is then filtered and washed with toluene (100 mL) and then heptane (200 mL). The sticky product is dried under nitrogen in the glovebox and is collected and dried under vacuum.

A sample of the indeno[1,2-b]indolyl lithium salt produced above (10 g, 42 mmol) is dissolved in toluene (95 mL) to produce an orange slurry. Diethyl ether (35 mL) is added slowly to give an orange solution. This solution is added over 15 min. at room temperature with stirring to a slurry of cyclopentadienylzirconium trichloride (11 g, 42 mmol) in toluene (190 mL) and diethyl ether (190 mL). The mixture turns deep red and is kept at room temperature overnight. The slurry is filtered to recover a red solid, which is washed with toluene (200 mL) and dried under vacuum to give the catalyst (16.5 g, 78%).

EXAMPLE 3

Preparation of Silica-Supported, Mixed Bridged and Non-Bridged Indenoindolyl Catalysts Silica (Fuji G-3) is calcined for 16 h at 200° C. Methylalumoxane (2.4 mL of 1.4 M solution of MAO in toluene, product of Albemarle) is added to a 12 g-sample of the calcined silica in 50 mL of toluene, and the mixture is stirred at ambient temperature for 1 h and then at 100° C. for 2 h. The bridged catalyst from Example 1 (0.27 g) and the non-bridged catalyst from Example 2 (0.27 g) and MAO solution (14 mL) are mixed. The mixture is dissolved in toluene (30 mL). The solution is added to the pretreated silica. Removal of volatiles gives a free-flowing powder used in the polymerization step.

EXAMPLE 4

Two-Stage Ethylene Polymerization with Silica-Supported, Mixed Bridged and Non-Bridged Indenoindolyl Catalysts Stage 1: Preparation of a First Multimodal Resin Hexane (193 parts per hour), ethylene (30 parts per hour), 1-butene (0.04 part per hour), hydrogen (0.0007 part per hour), and the supported catalyst from Example 3 (0.0027 part per hour) are continuously fed into a first reactor. The reactor temperature is controlled at 72° C. to give a first bimodal resin. The first bimodal resin has a lower molecular weight mode and a higher molecular weight mode. The lower molecular weight mode is expected to have an $MI_2$ of 15 dg/min, a density of 0.95 g/cc, and essentially no measurable long chain branching. The higher molecular weight mode is expected to have an $MI_2$ of 0.07 dg/min, density of 0.94 g/cc, and LCBI of 0.1. The higher molecular weight mode/lower molecular weight mode is 48/52 by weight.

The properties of each mode are estimated based on polymers made from each catalyst run separately under similar reaction conditions. This estimation is also used in the following examples.

Stage 2: Preparation of a Second Multimodal Resin

The first bimodal resin is transferred to a flash drum, where hydrogen and other volatile materials are removed. It is then transferred to a second reactor. Hexane (42.9 parts per hour), 1-butene (1.33 parts per hour) and ethylene (16.7 parts per hour) are continuously fed into the second reactor. The reactor temperature is maintained at 72° C. to give a second bimodal resin that is mixed in-situ with the first bimodal resin. The second bimodal resin has a lower molecular mode, which is expected to have an $MI_2$ of 0.6 dg/min, a density of 0.94 g/cc, and essentially no long chain branching and a higher molecular weight mode, which is expected to have an $MI_2$ of 0.01 dg/min, a density of 0.92 g/cc, and an LCBI of 0.25. The higher molecular weight mode/lower molecular weight mode is 63/37 by weight. The first bimodal resin/second bimodal resin is 70/30 by weight.

EXAMPLE 5

Two-Stage Ethylene Polymerization with Silica-Supported, Mixed Bridged and Non-Bridged Indenoindolyl Catalysts Stage 1: Preparation of a First Multimodal Resin A 2L, stainless steel autoclave is charged with isobutane (1 L) pressurized at 70° C. to 220 psi with ethylene followed by addition of 20 mg of the supported catalyst from Example 3. Ethylene is supplied to the reactor on demand to produce 25 g of a first bimodal resin. The first bimodal resin has a lower molecular weight mode and a higher molecular weight mode. The lower molecular weight mode is expected to have a weight average molecular weight of 240,000, density of 0.95 g/ g/cc, and no measurable long chain branching. The higher molecular weight mode is expected to have a weight average molecular weight of 420,000, density of 0.94, and LCBI of 0.3. The higher molecular weight mode/lower molecular weight mode is 45/55 by weight.

Stage 2: Preparation of a second multimodal resin

Similarly to Stage 1, stage 2 is performed in a 2L, stainless steel autoclave. The reactor is charged with the supported catalyst (20 mg) from Example 3, isobutane (1 L) and butene-1 (10 ml) and pressurized at 60° C. to 300 psi with ethylene. Ethylene is supplied to the reactor on demand to produce 25 g of a second bimodal resin. The second bimodal resin has a lower molecular weight mode and a higher molecular weight mode. The lower molecular weight mode is expected to have a weight average molecular weight of 180, 000, density of 0.94, and no measurable long chain branching. The higher molecular weight mode is expected to have a weight average molecular weight of 220,000, density of 0.92, and LCBI of 0.3. The higher molecular weight mode/lower molecular weight mode is 40/60 by weight. The resins from stage 1 and stage 2 are thoroughly blended.

We claim:

1. A multi-stage process comprising:
   (a) polymerizing, in the presence of two or more single-site catalysts, ethylene or a mixture of ethylene and a $C_3$ to $C_{10}$ α-olefin at a hydrogen/monomer molar ratio within the range of about 0.0001/1 to about 10/1 to produce a first multimodal resin; and
   (b) continuing the polymerization in the presence of the same catalysts as in stage (a) at a reduced hydrogen/monomer ratio to produce a second multimodal resin;
   wherein the single-site catalysts comprise an indenoindolyl catalyst.

2. The process of claim 1, wherein stage (b) is performed at an increased α-olefin/ethylene ratio.

3. The process of claim 1, wherein the single-site catalysts comprise a non-bridged indenoindolyl catalyst and a bridged indenoindolyl catalyst.

4. The process of claim 3, wherein the non-bridged and bridged catalysts are mixed and supported together.

5. A multi-stage process comprising:
   (a) polymerizing, in the presence of two single-site catalysts, ethylene or a mixture of ethylene and a $C_3$ to $C_{10}$ α-olefin at a hydrogen/monomer molar ratio less than 1/1 to produce a first multimodal resin; and
   (b) continuing the polymerization in the presence of the same catalysts as in stage (a) at an increased hydrogen/monomer molar ratio to produce a second multimodal resin;
   wherein the single-site catalysts comprise an indenoindolyl catalyst.

6. The process of claim 5, wherein the single-site catalysts comprise a non-bridged indenoindolyl catalyst and a bridged indenoindolyl catalyst.

7. The process of claim 6, wherein the non-bridged and the bridged catalysts are mixed and supported together.

* * * * *